US008569400B2

(12) United States Patent
Kouno et al.

(10) Patent No.: US 8,569,400 B2
(45) Date of Patent: Oct. 29, 2013

(54) ELASTOMER COMPOSITION AND TIRE USING THE ELASTOMER COMPOSITION

(75) Inventors: Yoshihide Kouno, Kunitachi (JP); Seiji Kon, Kodaira (JP); Yusuke Nozaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 130 days.

(21) Appl. No.: 12/999,463

(22) PCT Filed: Jun. 10, 2009

(86) PCT No.: PCT/JP2009/060631
§ 371 (c)(1),
(2), (4) Date: Feb. 28, 2011

(87) PCT Pub. No.: WO2009/154121
PCT Pub. Date: Dec. 23, 2009

(65) Prior Publication Data
US 2011/0160354 A1    Jun. 30, 2011

(30) Foreign Application Priority Data

Jun. 18, 2008 (JP) .................. 2008-158940
Jun. 18, 2008 (JP) .................. 2008-159496
Jun. 18, 2008 (JP) .................. 2008-159530
Oct. 30, 2008 (JP) .................. 2008-280030

(51) Int. Cl.
*C08L 1/02* (2006.01)

(52) U.S. Cl.
USPC ........................................... 524/35

(58) Field of Classification Search
USPC ................................................ 524/35
See application file for complete search history.

(56) References Cited

U.S. PATENT DOCUMENTS

| 3,844,987 A | 10/1974 | Clendinning et al. |
| 6,482,884 B1 | 11/2002 | Schaal et al. |
| 2008/0095881 A1 | 4/2008 | Ber |

FOREIGN PATENT DOCUMENTS

| DE | 10 2005 059 313 A1 | 6/2007 |
| EP | JP 2002-069243 A * | 3/2002 |
| EP | 1344960 A2 | 9/2003 |
| EP | 1978156 A1 | 10/2008 |
| JP | 09-103285 A | 4/1997 |
| JP | 91/03285 A | 4/1997 |
| JP | 2002-69243 A | 3/2002 |
| JP | 2002/069243 A | 3/2002 |
| JP | 2002/080732 A | 3/2002 |
| JP | 2002-080732 A | 3/2002 |
| JP | 2003-063206 A | 3/2003 |
| JP | 2004-196944 A | 7/2004 |
| JP | 2004/196944 A | 7/2004 |
| JP | 2005-75856 A | 3/2005 |
| JP | 2005-295836 A | 10/2005 |
| WO | 99/52981 A1 | 10/1999 |
| WO | 2006/109110 A1 | 10/2006 |

OTHER PUBLICATIONS

Chinese Office Action, dated Jul. 3, 2012, issued in corresponding Chinese Application No. 200980131010.6.
Chinese Search Report, dated Jun. 25, 2012, issued in corresponding Chinese Application No. 200980131010.6.
Extended European Search Report issued Dec. 16, 2011, in European Patent Application No. 09766569.9.

* cited by examiner

*Primary Examiner* — Robert D. Harlan
(74) *Attorney, Agent, or Firm* — Sughrue Mion, PLLC

(57) ABSTRACT

An object of the invention is to provide an elastomer composition containing a substance as an alternative raw material for an elastomer component, which is low in environmental load and capable of being produced at low cost, and a tire using the elastomer composition. Here, the elastomer composition and the tire of the invention are characterized in containing residuum generated in a fermentative treatment of an organic matter in an elastomer component. In addition, as the above fermentative treatment, an anaerobic fermentative treatment or an aerobic fermentative treatment can be used.

24 Claims, 1 Drawing Sheet

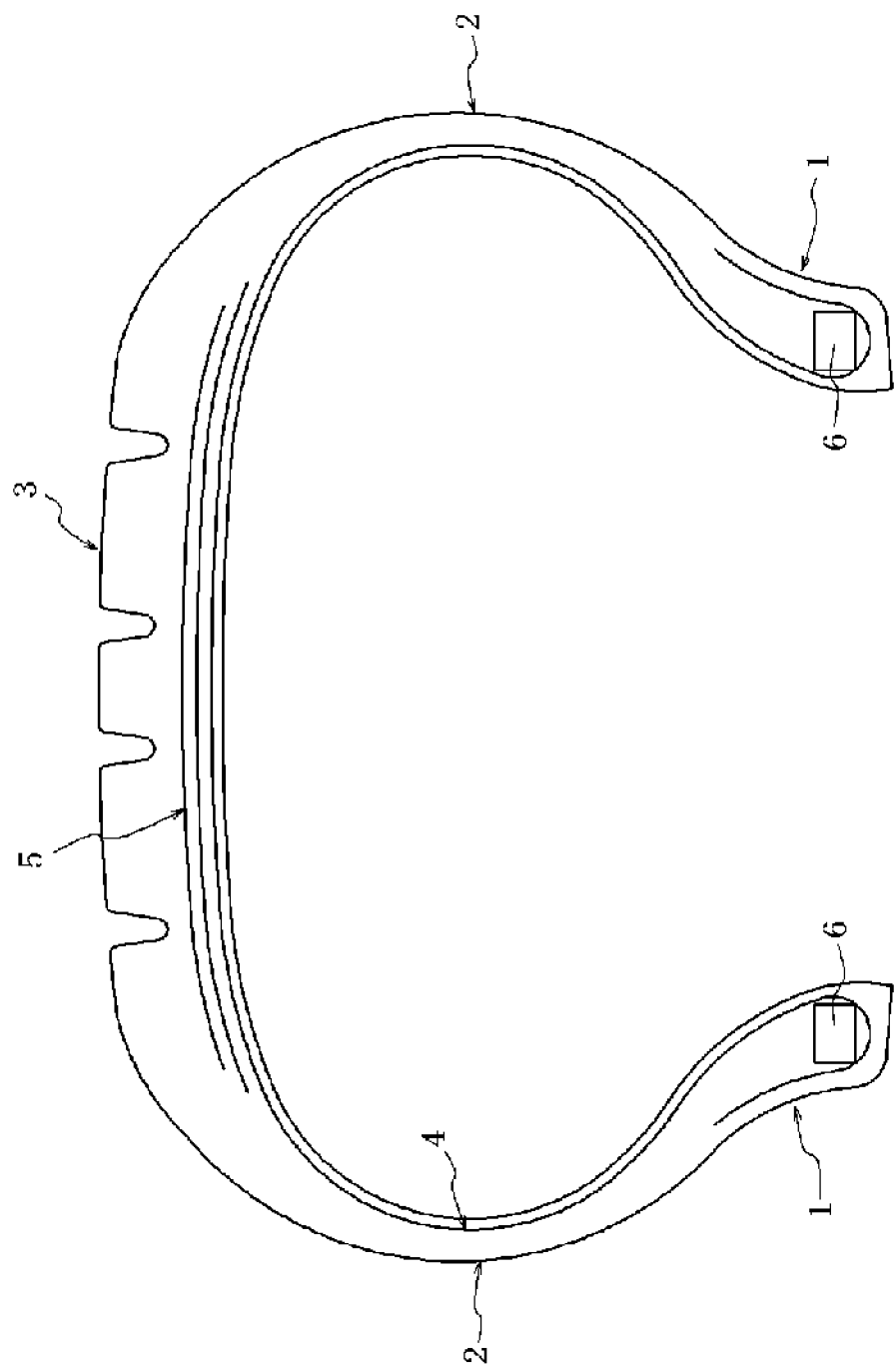

ELASTOMER COMPOSITION AND TIRE USING THE ELASTOMER COMPOSITION

CROSS REFERENCE TO RELATED APPLICATIONS

This application is a National Stage of International Application No. PCT/JP2009/060631 filed Jun. 10, 2009, claiming priority based on Japanese Patent Application Nos. 2008-159496 filed Jun. 18, 2009, 2008-158940 filed Jun. 18, 2008, 2008-159530 filed Jun. 18, 2008 and 2008-280030 filed Oct. 30, 2008, the contents of all of which are incorporated herein by reference in their entirety.

TECHNICAL FIELD

The invention relates to an elastomer composition using a reduced amount of an elastomer component and a tire using the elastomer composition.

BACKGROUND ART

An elastomer composition such as a rubber composition used in tires and the like contains a large amount of an elastomer component (rubber, etc.) as a raw material, and for example in the case of a pneumatic tire for passenger cars using a rubber composition, a rubber component containing natural rubber and synthetic rubber constitutes 50 mass % or more of the rubber composition. Therefore, such a rubber composition and a tire using the rubber composition are liable to be affected by a steep rise in oil price, poor crop of rubber due to bad weather and the like, leading to increase in raw material cost and difficulty in stable supply of the products.

Moreover, as the global trend has been to place greater importance on environmental issues in recent years, particularly from the perspective of prevention of global warming, regulations on $CO_2$ emission are tightened, reduction in the usage of oil resources is required, and establishment of resource recycling society is also required.

Therefore, in order to reduce the usage of oil resources in producing tires, a so-called eco tire in which raw materials comprising non-oil resources constitute 75 weight % or more of the total weight is disclosed in JP-A-2003-063206, for example.

SUMMARY OF THE INVENTION

However, in the elastomer composition and the tire of the above conventional technology, although the usage of oil resources can be reduced, since the production process could be complicated and the unit price of alternative raw materials for oil resources could be expensive, the production cost could not have necessarily been reduced.

Moreover, the alternative raw materials had a possibility of improvement and choice from the perspectives of process energy required for the use (e.g., energy required for fracturing the alternative raw materials) and high availability of the alternative raw materials themselves as fuels, resources and the like.

It is, therefore, an object of the invention to advantageously solve the above problems, and an elastomer composition of the invention is characterized in containing residuum generated in a fermentative treatment of an organic matter in an elastomer component. By containing residuum remaining after the use of resources such as residuum generated in a fermentative treatment of an organic matter as above, it is possible to reduce the usage of an elastomer component in an elastomer composition. Moreover, the residuum generated in a fermentative treatment of an organic matter, which is cheap remnant, is suitable as an alternative raw material. Therefore, by containing the residuum in an elastomer composition, it is possible to provide an elastomer composition at a low price and with low environmental load. Furthermore, residuum after a fermentative treatment also has an advantage of being easy to handle, because the majority of putrefaction factors such as protein and lipid is degraded during the fermentative treatment. In addition, fermentation of an organic matter is a concept meaning biodegradation of an organic matter, including both anaerobic fermentation and aerobic fermentation and also including degradation of sugars.

Here, in the elastomer composition of the invention, the above organic matter is preferably biomass. Thus by using biomass as a regenerable organic resource of biological origin, it is possible to further reduce environmental load in producing an elastomer composition.

In the elastomer composition of the invention, the above fermentative treatment is preferably an anaerobic fermentative treatment using anaerobic microbes. It is because by containing residuum after an anaerobic fermentative treatment in an elastomer component, the usage of oil-derived elastomer such as synthetic rubber can be reduced. Additionally, residuum generated by an anaerobic fermentative treatment is preferably contained after smoke treatment to be hereinafter described in detail. It is because by conducting smoke treatment, it is possible to contain residuum in a desulfurized (deodorized) and sterilized state of being easy to handle in an elastomer component.

Here, the above anaerobic fermentative treatment is preferably a methane fermentative treatment, an ethanol fermentative treatment or a hydrogen fermentative treatment, or a combination thereof. It is because by using residuum after effectively extracting fuels and the like from resources by means of a methane fermentative treatment, an ethanol fermentative treatment or a hydrogen fermentative treatment, reduction in environmental load as well as effective use of resources can be attempted without going through unnecessary steps before being contained in an elastomer component.

Additionally, in the elastomer composition of the invention, the above fermentative treatment is preferably an aerobic fermentative treatment using aerobic microbes. It is because by using residuum after an aerobic fermentative treatment with few odors, it is possible to make a deodorization treatment upon being contained unnecessary.

Also, in the elastomer composition of the invention, a diameter of the above residuum is preferably 0.02 μm to 200 μm, and when the residuum aggregates to be a mass, the mass size is preferably 0.5 μm to 2 mm. It is because an operation of fracturing cell walls by using a grinder mill is required so as to make a diameter of residuum less than 0.02 μm, and also fine residuum is difficult to handle. Moreover, it is because when the diameter is more than 200 μm or the mass size is more than 2 mm, the dispersibility in an elastomer component deteriorates, resulting in extraneous materials, which lead deterioration in physical property such as breaking elongation. In addition, a diameter and a mass size are obtained from particle size measurement by laser diffraction (JISZ8825-1), and are values obtained by measuring an average of long axis–short axis of residuum etc. (considered to be in a spherical form) in the method using laser diffraction.

Also, in the elastomer composition of the invention, the above residuum is preferably residuum generated in a fermentative treatment of an organic matter using fermentation microorganisms, and containing cell walls of the fermentation microorganisms. It is because since residuum such as excess sludge generated in a fermentative treatment, which is waste with low availability existing in a large amount, is at a low price, and does not require any complicated steps or considerable process energy upon being contained, it is suitable as an alternative raw material for an elastomer component (an extender of an elastomer composition).

Here, in the elastomer composition of the invention, a main component of the above residuum is preferably peptidoglycan. It is because by containing residuum having peptidoglycan with less influence on an elastomer composition upon being contained as a main component, it is possible to reduce the usage of an elastomer component without deteriorating performance of an elastomer composition. Here, a main component of residuum means a main one of components constituting residuum, for example, a component constituting more than 50 mass % of residuum.

In the elastomer composition of the invention, the above residuum is preferably contained in the above elastomer component after being subjected to smoke treatment or carbonization treatment. Here, smoke treatment means smoking residuum with smoke generated in heating wood and the like. It is because by conducting smoke treatment, it is possible to contain residuum in a desulfurized (deodorized) and sterilized state of being easy to handle in an elastomer component. Also, carbonization treatment means carbonizing residuum at a temperature about 800° C. by using a carbonization furnace.

In the elastomer composition of the invention, a diameter of the above residuum is preferably 0.02 to 50 μm. Residuum with a diameter of less than 0.02 μm is difficult to handle, and residuum with a diameter of more than 50 μm is poor in dispersibility in an elastomer component. In addition, a diameter is obtained from particle size measurement by laser diffraction (JISZ8825-1), and is a value obtained by measuring an average of long axis–short axis of residuum (considered to be in a spherical form) in the method using laser diffraction.

Also, in the elastomer composition of the invention, the above residuum is preferably residuum generated in a fermentative treatment of an organic matter containing at least one of plant cell walls and short fibers of the plant cell walls in chains, and containing at least one of the plant cell walls and short fibers. It is because since residuum containing at least one of plant cell walls and short fibers is at a low price and is capable of reducing the amount of waste by being contained in an elastomer composition, it is suitable as an alternative raw material for an elastomer component (an extender of an elastomer composition, etc.).

Here, in the elastomer composition of the invention, the above residuum preferably comprises at least one of cellulose particles and hemicellulose particles as a main component of the above plant cell walls. It is because cellulose particles and hemicellulose particles are suitable as alternative raw materials in point of good dispersibility and not having a bad influence on the performance of an elastomer composition. Moreover, it is because there is also the effect of being able to reduce the usage of oil-derived elastomer. Furthermore, it is because by containing at least one of cellulose particles and hemicellulose particles as simple substances in an elastomer composition, cellulose particles and hemicellulose particles act as micro drainages. Therefore, by using an elastomer composition containing at least one of cellulose particles and hemicellulose particles in winter tires for example, performance of winter tires (on-ice performance, etc.) can be improved. Also, a diameter of the above cellulose particles and hemicellulose particles is preferably 0.02 μm to 50 μm. It is because they are difficult to handle when the diameter is less than 0.02 μm, and they are poor in dispersibility in an elastomer component when the diameter is more than 50 μm.

In addition, a diameter is obtained from particle size measurement by laser diffraction (JISZ8825-1), and is a value obtained by measuring an average of long axis–short axis of particles (considered to be in a spherical form) in the method using laser diffraction. Moreover, when the above cellulose particles and hemicellulose particles aggregate to be a mass, a diameter of the mass is preferably 0.5 μm to 2 mm from the perspectives of handleability and dispersibility.

In the elastomer composition of the invention, the above residuum preferably comprises the above short fibers, and the short fibers preferably comprise at least one of cellulose short fibers and hemicellulose short fibers. It is because since cellulose or hemicellulose fibers can also act as fiber reinforcing materials of the elastomer composition, they are suitable as alternative materials. Moreover, a diameter of the above short fibers is preferably 1 μm to 150 μm, and a length of the above short fibers is preferably 0.3 mm to 5 mm. It is because the dispersibility is poor with a large diameter and a long length, and the reinforcing effect is low with a small diameter and a short length. Furthermore, the above short fibers are preferably in bundles of 2 to 10 aggregating fibers. It is because although the reinforcing effect increases by being in bundles, the dispersibility deteriorates with too many numbers of aggregating fibers.

In the elastomer composition of the invention, the above residuum preferably contains at least one of cellulose particles and hemicellulose particles as a main component of the above plant cell walls, and short fibers of the above plant cell walls in chains. It is because in the case of containing both of particles and short fibers, the particles attach to the short fibers, then a fine unevenness is formed on surfaces of the short fibers and the like by the attached particles, and the physical bonding to an elastomer component is strengthened. In addition, ones with an aspect ratio of 1 to 5 are referred to as particles and ones with 6 to 50 as short fibers herein.

In the elastomer composition of the invention, the above fermentative treatment is preferably a treatment using at least one of aspergillus and yeast, and the above cellulose particles and hemicellulose particles preferably have cell walls of at least one of aspergillus and yeast attached. Moreover, in the elastomer composition of the invention, the above fermentative treatment is preferably a treatment using at least one of aspergillus and yeast, and the above short fibers preferably have cell walls of at least one of aspergillus and yeast attached. It is because when cell walls of at least one of aspergillus and yeast are attached as above, a fine unevenness is formed on surfaces of the short fibers and the like by the attached aspergillus and yeast and the physical bonding to an elastomer component is strengthened.

In the elastomer composition of the invention, the amount of the above residuum contained is preferably 1 to 50 parts by mass based on 100 parts by mass of the above elastomer component. It is because by making the amount of residuum contained not less than 1 part by mass, it is possible to provide an elastomer composition capable of sufficiently accomplishing reduction in environmental load, which is a purpose of the invention. Moreover, it is because by making the amount of residuum contained not more than 50 parts by mass, it is possible to provide an elastomer composition having a performance equivalent to an elastomer composition using no alternative raw material.

Also, a tire of the invention is characterized in that the above elastomer composition constitutes at least one part thereof. By constituting a part, which has been constituted with only an elastomer composition such as a rubber composition in conventional tires, with an elastomer composition containing residuum generated in a fermentative treatment of an organic matter, it is possible to reduce the usage of an elastomer component to thereby reduce environmental load while maintaining performance as a tire.

According to the invention, it is possible to provide an elastomer composition, which can be produced at low cost without using any complicated production process and is environmentally friendly. Also, it is possible to provide a tire with low environmental load in production using the elastomer composition.

BRIEF DESCRIPTION OF DRAWINGS

FIG. 1 is a cross section view showing an example of a tire of the invention.

BEST MODE FOR CARRYING OUT THE INVENTION

<Elastomer Composition>

Below, the elastomer composition of the invention will be described in detail. The elastomer composition according to the invention is characterized in that by containing residuum generated in a fermentative treatment of an organic matter in an elastomer component and kneading, the usage amount of the elastomer component is reduced.

Here, the elastomer component comprises a rubber component (natural rubber, synthetic rubber), thermoplastic elastomer, thermoset elastomer, or a combination thereof, and the synthetic rubber specifically includes styrene-butadiene copolymer rubber (SBR), polybutadiene rubber (BR), polyisoprene rubber (IR), acrylonitrile-butadiene copolymer rubber (NBR), chloroprene rubber (CR), butyl rubber (IIR), etc. Also, the thermoplastic elastomer includes ethylene-methyl acrylate copolymer, styrene based elastomer, urethane based elastomer, polyolefin based elastomer, etc., and the thermoset elastomer includes phenol based elastomer, urea based elastomer, melamine based elastomer, epoxy based elastomer, etc. In addition, the elastomer composition of the invention may arbitrarily contain a reinforcing filler such as carbon black and silica, a softening agent such as aroma oil, an additive agent commonly added such as a vulcanization accelerator, an auxiliary vulcanization accelerator, an antioxidant agent, etc.

The organic matter to be subjected to a fermentative treatment includes biomass as regenerable organic resources of biological origin including, for example, waste biomass such as paper, livestock excrement, leftover food, distilled spirit residue (e.g., sweet potato distilled spirit residue, rice distilled spirit residue, barley distilled spirit residue), construction waste wood, black liquor and excess sludge (e.g., sewage sludge, night soil sludge, methane fermented sludge), unused biomass such as rice straw, straw, rice husks and logging residue (e.g., thinned wood, damaged trees), resource crop biomass such as feed crops, fruits (e.g., grapes, apples, cherries, palm fruits), grain (e.g., rice, wheat, corn), root vegetables (e.g., potatoes, sweet potatoes) and starch crops (e.g., sugarcane), and encystment of urochordates such as ascidian. By using such biomass, it is possible to further reduce environmental load in producing an elastomer composition. In addition, it is preferable to use waste biomass as an organic matter from the perspectives of effective use of resources and reduction in environmental load.

Additionally, among the above organic matters, the organic matter containing at least one of plant cell walls and short fibers of the plant cell walls in chains includes resource crop biomass such as fruits, grain, root vegetables and sugarcane, and encystment of urochorodates, for example ascidian, as well as waste biomass such as sweet potato distilled spirit residue, rice distilled spirit residue and barley distilled spirit residue, unused biomass such as rice straw and straw. Moreover, the organic matter containing at least one of plant cell walls and short fibers of the plant cell walls in chains is, among the above, preferably sweet potato distilled spirit residue, rice distilled spirit residue and barley distilled spirit residue from the perspectives of availability and reusability as resources. Also, sweet potato distilled spirit residue, rice distilled spirit residue and barley distilled spirit residue are preferable in point that cellulose short fibers and the like in the residues are sufficiently fine, since raw materials are ground in the process of producing distilled spirits (e.g., ground sweet potatoes are added at the second fermentation step in the production of sweet potato distilled spirits).

Also, when residuum generated in a fermentative treatment of excess sludge such as sewage sludge, sludge of treated livestock waste, sludge of treated raw garbage and food/beverage waste, or sludge of aerobically or anaerobically treated discharged water including washing water discharged from brewing companies as an organic matter is used, the excess sludge to be subjected to the fermentative treatment is preferably one not containing any iron based aggregating agent, for example sludge using an aluminum compound as an aggregating agent from the perspectives of weight saving of an elastomer composition and prevention of a bad influence on an elastomer composition due to metal inclusion, and for example excess sludge not containing any aggregating agent, for example granules and the like self-granulated by microbes, is more preferable.

Here, as a method for conducting a fermentative treatment of an organic matter, the fermentative treatment using anaerobic microbes includes for example methane fermentation using methane production microorganisms, ethanol fermentation using an ethanol fermentation microorganisms, hydrogen fermentation using hydrogen production microorganisms, and the like, and the fermentative treatment using aerobic microbes includes for example acetate fermentation using acetate formation microorganisms, a wastewater treatment using various oxidative bacteria such as ammonium oxidizing bacteria, and the like.

Also, the residuum to contain in an elastomer component includes, for example, excess sludge generated in conducting biological treatment (fermentation) of an organic matter under aerobic or anaerobic condition (which has not been degraded in a fermentative treatment), residue after a fermentative treatment such as various distilled spirit residues, and the like. Here, when excess sludge is used as residuum, from the perspectives of weight saving of an elastomer composition and prevention of a bad influence on an elastomer composition due to metal inclusion, sludge not containing any iron based aggregating agent, for example sludge using an aluminum compound as an aggregating agent is preferable, and sludge not containing any aggregating agent is more preferable. In addition, as residuum, residue as remaining grounds after filtration may be used.

Additionally, residuum can be contained in an elastomer component after removing hydrogen sulfide by using smoke treatment or carbonization treatment for example. Here, smoke treatment means smoking residuum with smoke generated in heating wood, and carbonization treatment means carbonizing residuum at a high temperature about 800° C. By conducting smoke treatment or carbonization treatment, it is possible to contain residuum in a desulfurized (deodorized) and sterilized state of being easy to handle in an elastomer component.

Other examples of residuum capable of being contained in the elastomer composition of the invention include residuum generated in a fermentative treatment of an organic matter using fermentation microorganisms, and containing cell walls of the fermentation microorganisms, and residuum generated in a fermentative treatment of an organic matter containing at least one of plant cell walls and short fibers of the plant cell walls in chains, and containing at least one of the plant cell walls and short fibers. More specifically, residuum containing peptideglycan contained in cell walls of fermentation microorganisms and the like, cellulose particles, hemicellulose particles and lignin contained in plant cell walls, short fibers of plant cell walls in chains (cellulose short fibers, hemicellulose short fibers, etc.), or a mixture thereof is included. In addition, residuum preferably contains at least one of cellulose particles and hemicellulose particles as simple substances. Moreover, it is further preferable to contain both at least one of cellulose particles and hemicellulose particles, and short fibers. It is because since by containing at least one of cellulose particles and hemicellulose particles as simple substances in an elastomer composition, cellulose particles and hemicellulose particles can act as micro drainages, when the elastomer composition is used in winter tires for example, the performance of winter tires (on-ice performance, etc.) can be improved. Also, it is because by containing both particles and short fibers, when the elastomer composition is used in winter tires for example, it is possible to have the effect of absorbing moisture. Furthermore, residuum preferably contains peptideglycan, at least one of cellulose particles and hemicellulose particles, and at least one of cellulose short fibers and hemicellulose short fibers. It is because by containing peptideglycan, particles and short fibers, when the elastomer composition is used in winter tires for example, it is possible to have the effect of absorbing moisture. For reference, cellulose particles and hemicellulose particles and cellulose short fibers and hemicellulose short fibers can be isolated by washing away particles, for example, from a mixture thereof.

Here, cellulose particles and hemicellulose particles preferably have cell walls of at least one of aspergillus and yeast attached. Moreover, short fibers also preferably have cell walls of at least one of aspergillus and yeast attached. It is because when cell walls of at least one of aspergillus and yeast are attached as above, a fine unevenness is formed on surfaces of the short fibers and the like by the attached aspergillus and yeast and the physical bonding to an elastomer component is strengthened.

In addition, cellulose particles and hemicellulose particles are main components of plant cell walls, and have an aspect ratio of 1 to 5. Also, cellulose short fibers and hemicellulose short fibers are plant cell walls in chains, and have an aspect ratio of 6 to 50.

Here, a diameter of residuum to contain in an elastomer component is preferably 0.02 μm to 200 μm from the perspectives of handleability and dispersibility. It is because an operation of fracturing cell walls by using a grinder mill is required so as to make a diameter of residuum less than 0.02 μm and also fine residuum is difficult to handle. Moreover, it is because when the diameter is more than 200 μm, the dispersibility in an elastomer component deteriorates, resulting in extraneous materials, which lead deterioration in physical property such as breaking elongation. In addition, a diameter of residuum generated in a fermentative treatment of an organic matter using fermentation microorganisms, and containing cell walls of the fermentation microorganisms is preferably 0.02 μm to 50 μm, and a diameter of cellulose particles and hemicellulose particles is preferably 0.02 μm to 50 μm.

Also, when residuum aggregates to be a mass, the mass size is preferably 0.5 μm to 2 mm. It is because when the mass size is more than 2 mm, the dispersibility in an elastomer component is poor. Moreover, a diameter of short fibers is preferably 1 μm to 150 μm, and a length of short fibers is preferably 0.3 mm to 5 mm. It is because the dispersibility is poor with a large diameter and a long length, and the reinforcing effect to an elastomer composition and the drainage effect of an elastomer composition are low with a small diameter and a short length. Furthermore, short fibers are preferably in bundles of 2 to 10 aggregating fibers. It is because although the reinforcing effect to an elastomer composition and the drainage effect of an elastomer composition increase by being in bundles, the dispersibility deteriorates with too many numbers of aggregating fibers.

The elastomer composition of the invention is not particularly limited except that containing residuum generated in a fermentative treatment of an organic matter in an elastomer component, and can be produced as follows, for example. In addition, a method of preparing the elastomer composition of the invention is not particularly limited, and can be prepared by kneading residuum and various compounding agents arbitrarily selected according to the need in an elastomer component by using the Banbury mixer, roll and the like, for example.

Also, the amount of residuum contained is preferably 1 to 50 parts by mass, more preferably 5 to 20 parts by mass based on 100 parts by mass of an elastomer component. It is because by making the amount of residuum contained not less than 1 part by mass, it is possible to sufficiently accomplish a reduction in environmental load, and by making the amount of residuum contained not more than 50 parts by mass, it is possible to provide an elastomer composition having a performance equivalent to an elastomer composition using no alternative raw material.

<Elastomer Composition Preparation Example 1>

First, residuum remaining after methane fermentation of leftover food is subjected to smoke treatment at a temperature of 800° C. for example, so as to sterilize fungus bodies as well as removing hydrogen sulfide in the residuum.

Next, the residuum after smoke treatment is contained in an elastomer component with an arbitrary filler (carbon black, etc.) and additive agent, and kneaded.

<Elastomer Composition Preparation Example 2>

First, residuum remaining after methane fermentation of leftover food is subjected to carbonization treatment at a temperature of 800° C. for example, so as to sterilize fungus bodies as well as removing hydrogen sulfide in the residuum.

Next, the residuum after carbonization treatment is contained in an elastomer component with an arbitrary filler (carbon black, etc.) and additive agent, and kneaded.

<Elastomer Composition Preparation Example 3>

First, residuum is dried, and cellulose particles or hemicellulose particles, or cellulose short fibers or hemicellulose short fibers are extracted from the dried residuum by the above method according to the need.

Next, the dried residuum, cellulose particles or hemicellulose particles, or cellulose short fibers or hemicellulose short fibers are contained in an elastomer component with an arbitrary filler (carbon black, etc.) and additive agent, and kneaded.

<Tire>

The tire of the invention is characterized in that the above elastomer composition constitutes at least one part thereof. It can be produced by using the same production method as normal tires except for the above.

Next, the tire of the invention will be described in detail with reference to the drawing. FIG. 1 is a cross section view showing an example of the tire of the invention. The tire shown in FIG. 1 comprises a pair of bead portions 1, a pair of side wall portions 2, a tread portion 3 continuing into both the side wall portions 2, a carcass 4 extending toroidally between the above pair of bead portions 1 and reinforcing each of the portions 1, 2 and 3, and a belt 5 located outside of a crown portion of the carcass 4 in a radial direction.

In the tire shown, the carcass 4 comprises one carcass ply, and also comprises a main body portion extending toroidally between a pair of bead cores (wires) 6 each arranged within the above bead portions 1, and turned end portions rolled up from the inside towards the outside in a tire width direction outwardly in a radial direction around each of the bead cores 6. In addition, although the carcass 4 shown comprises one carcass ply, the number of carcass plies may be plural in the tire of the invention.

Also, in the tire shown, although the belt 5 comprises two belt layers, the number of belt layers constituting the belt is not limited to this and may be one or more in the tire of the invention. Moreover, the tire of the invention may comprise a belt reinforcing layer comprising a rubberized layer of cords arrayed substantially parallel to a tire circumferential direction provided outside the belt 5 in a tire radial direction, and can further comprise interlayer rubber between end portions of the belt 5 and the belt reinforcing layer.

Moreover, the tire shown is characterized in that an elastomer composition containing the above cellulose short fibers is used at least in the tread portion 3. By using an elastomer composition containing cellulose short fibers in the tread portion 3, it is possible to provide a tire capable of improving running stability, wet performance, and snow and ice performance with interaction between cellulose short fibers and road surfaces.

In addition, members using the above elastomer composition include side rubber, bead fillers or stiffeners located outside of bead wires in a radial direction, coating rubber for carcasses and belts, and the like, other than tread rubber.

Also, as gas to fill up the tire of the invention, normal air or air with adjusted partial pressure of oxygen as well as inert gas such as nitrogen, argon and helium can be used.

EXAMPLES

Although the invention will be described in more detail with examples below, the invention is not limited to the following examples at all.

Examples 1-3

Rubber compositions as elastomer compositions were prepared based on the compounding formulation shown in Table 1 by using the Banbury mixer, a known vulcanizing agent and the like (sulfur: 1.5 parts by mass, a vulcanization accelerator: 2.9 parts by mass [CZ (N-cyclohexyl-2-benzothiazole sulfenamide): 1.5 parts by mass, DPG (diphenyl guanidine): 1.2 parts by mass, DM (dibenzothiazyl disulfide): 0.2 parts by mass], ZnO: 2.0 parts by mass, stearic acid: 1.0 parts by mass, an antioxidant agent 6C: 1.0 parts by mass, based on 100 parts by mass of a rubber component) were contained and vulcanized by the normal method, and then the performances were measured and evaluated by the following method. The results are shown in Tables 2 to 4. In addition, "smoked residuum content rate in rubber composition" in Table 1 was calculated based on the following formula:

smoked residuum content rate=amount of smoked residuum contained/(amount of rubber component contained+amount of carbon black contained+amount of smoked residuum contained)×100 and a component contained in a small amount (e.g., a vulcanizing agent etc.) was ignored.

Conventional Example 1

A rubber composition as an elastomer composition was prepared based on the compounding formulation shown in Table 1 by using the Banbury mixer, a known vulcanizing agent and the like (sulfur: 1.5 parts by mass, a vulcanization accelerator: 2.9 parts by mass [CZ: 1.5 parts by mass, DPG: 1.2 parts by mass, DM: 0.2 parts by mass], ZnO: 2.0 parts by mass, stearic acid: 1.0 parts by mass, an antioxidant agent 6C: 1.0 parts by mass, based on 100 parts by mass of a rubber component) were contained and vulcanized by the normal method, and then the performance was measured and evaluated by the following method. The result is shown in Tables 2 to 4.

<Evaluation>

(S-S Curve)

The tensile stress and the breaking elongation of vulcanized rubber obtained by vulcanizing the rubber compositions prepared in Examples 1 to 3 and Conventional Example 1 at 160° C. for 15 minutes were measured for both the orientation direction and the vertical direction, and the tensile stress-strain curve (S-S Curve) was prepared. More specifically, the tensile stress was measured under conditions of a temperature at −45 to 62° C. and a frequency at 52.1 Hz by using a tensile testing machine made by Toyo Seiki Seisaku-Sho Co., Ltd., and the breaking elongation was measured under conditions of a temperature at 25° C. and a tensile rate at 100 mm/min by using a strograph made by Toyo Seiki Seisaku-Sho Co., Ltd. The relationship between elongation and stress, the tensile breaking strength ($T_B$) and the breaking elongation ($E_B$) are shown in Table 2. In addition, the orientation direction refers to the orientation direction of the smoked residuum, and the vertical direction refers to the direction vertical to the orientation direction here.

(Dynamic Modulus and Loss Tangent)

The dynamic modulus (E') and the loss tangent (tan δ) of vulcanized rubber obtained by vulcanizing the rubber compositions prepared in Examples 1 to 3 and Conventional Example 1 at 160° C. for 15 minutes were measured under conditions of a temperature at 25° C., a frequency at 52.1 Hz, a strain at 0.09 to 5% for both the orientation direction and the vertical direction by using a viscoelasticity measuring instrument made by Ueshima Seisakusho Co., Ltd. The dynamic modulus (E') and the loss modulus (E") are shown in Table 3, and the loss tangent (tan δ) is shown in Table 4.

TABLE 1

|  |  | Conventional Example 1 | Example 1 | Example 2 | Example 3 |
|---|---|---|---|---|---|
| Rubber Component *1 | Parts by mass | 137.5 | 137.5 | 137.5 | 137.5 |
| Carbon Black *2 | Parts by mass | 60 | 60 | 60 | 60 |
| Smoked Residuum *3 | Parts by mass | 0 | 1 | 3 | 9 |
| Smoked Residuum Content Rate in Rubber Composition | mass % | 0 | 0.5 | 1.5 | 4.4 |

*1 Emulsion polymerized SBR, oil extended with 37.5 parts by mass of aroma oil based on 100 parts by mass of a rubber component
*2 Made by Asahi Carbon Co., Ltd., N110
*3 Sludge (with a diameter of 0.5-200 μm) containing methane fermentation microorganisms (with peptidoglycan content rate of 90%), having been subjected to smoke carbonization treatment (at a treatment temperature of 800° C.)

TABLE 2

|  | Convention Example 1 | | Example 1 | | Example 2 | | Example 3 | |
|---|---|---|---|---|---|---|---|---|
| Elongation [%] | Orientation Direction Stress [MPa] | Vertical Direction Stress [MPa] | Orientation Direction Stress [MPa] | Vertical Direction Stress [MPa] | Orientation Direction Stress [MPa] | Vertical Direction Stress [MPa] | Orientation Direction Stress [MPa] | Vertical Direction Stress [MPa] |
| 0 | 0 | 0 | 0 | 0 | 0 | 0 | 0 | 0 |
| 25 | 1.02 | 1 | 0.96 | 0.92 | 0.94 | 0.92 | 0.98 | 0.88 |
| 100 | 2.98 | 2.56 | 2.72 | 2.48 | 2.66 | 2.56 | 2.7 | 2.4 |
| 150 | 4.46 | 3.98 | 4.2 | 3.8 | 4.12 | 3.86 | 4.16 | 3.72 |
| 300 | 10.76 | 9.68 | 10.48 | 9.42 | 10.22 | 9.72 | 10.68 | 9.38 |
| 500 | — | 20.16 | — | 19.84 | — | 20.26 | 21.58 | 19.92 |
| $T_B$ [MPa] | 20.8 | 21 | 21.2 | 21 | 21 | 20.8 | 21.8 | 21.8 |
| $E_B$ [%] | 489.2 | 514.5 | 498.1 | 524.8 | 498.1 | 511.7 | 507 | 531.8 |

TABLE 3

|  | Conventional Example 1 | | | | Example 1 | | | |
|---|---|---|---|---|---|---|---|---|
|  | Orientation Direction | | Vertical Direction | | Orientation Direction | | Vertical Direction | |
| Elongation [%] | E' [MPa] | E'' [MPa] | E' [MPa] | E'' [MPa] | E' [MPa] | E'' [MPa] | E' [MPa] | E'' [MPa] |
| 0.09 | 23.6 | 4.62 | 21.6 | 4.20 | 20.9 | 4.10 | 21.8 | 4.39 |
| 0.49 | 17.3 | 5.16 | 15.9 | 4.67 | 15.1 | 4.60 | 15.8 | 4.77 |
| 1 | 12.8 | 4.65 | 12.0 | 4.29 | 11.1 | 4.14 | 11.6 | 4.34 |
| 3 | 7.45 | 2.95 | 7.21 | 2.82 | 6.46 | 2.56 | 6.84 | 2.73 |
| 5 | 5.09 | 1.79 | 4.92 | 1.75 | 4.37 | 1.58 | 4.71 | 1.69 |

|  | Example 2 | | | | Example 3 | | | |
|---|---|---|---|---|---|---|---|---|
|  | Orientation Direction | | Vertical Direction | | Orientation Direction | | Vertical Direction | |
| Elongation [%] | E' [MPa] | E'' [MPa] | E' [MPa] | E'' [MPa] | E' [MPa] | E'' [MPa] | E' [MPa] | E'' [MPa] |
| 0.09 | 22.9 | 4.42 | 21.2 | 4.23 | 23.0 | 4.43 | 22.4 | 4.55 |
| 0.49 | 16.1 | 4.78 | 15.4 | 4.62 | 16.3 | 4.92 | 16.0 | 4.98 |
| 1 | 11.7 | 4.33 | 11.4 | 4.21 | 11.8 | 4.42 | 11.7 | 4.43 |
| 3 | 6.75 | 2.65 | 6.69 | 2.63 | 6.80 | 2.65 | 6.94 | 2.79 |
| 5 | 4.59 | 1.66 | 4.61 | 1.62 | 4.67 | 1.66 | 4.72 | 1.70 |

TABLE 4

|  | Convention Example 1 | | Example 1 | | Example 2 | | Example 3 | |
|---|---|---|---|---|---|---|---|---|
| Elongation [%] | Orientation Direction tan δ [—] | Vertical Direction tan δ [—] | Orientation Direction tan δ [—] | Vertical Direction tan δ [—] | Orientation Direction tan δ [—] | Vertical Direction tan δ [—] | Orientation Direction tan δ [—] | Vertical Direction tan δ [—] |
| 0.09 | 0.20 | 0.19 | 0.20 | 0.20 | 0.19 | 0.20 | 0.19 | 0.20 |
| 0.49 | 0.30 | 0.29 | 0.30 | 0.30 | 0.30 | 0.30 | 0.30 | 0.31 |
| 1 | 0.36 | 0.36 | 0.37 | 0.37 | 0.37 | 0.37 | 0.37 | 0.38 |

TABLE 4-continued

| | Convention Example 1 | | Example 1 | | Example 2 | | Example 3 | |
| --- | --- | --- | --- | --- | --- | --- | --- | --- |
| Elongation [%] | Orientation Direction tan δ [—] | Vertical Direction tan δ [—] | Orientation Direction tan δ [—] | Vertical Direction tan δ [—] | Orientation Direction tan δ [—] | Vertical Direction tan δ [—] | Orientation Direction tan δ [—] | Vertical Direction tan δ [—] |
| 3 | 0.40 | 0.39 | 0.40 | 0.40 | 0.39 | 0.39 | 0.39 | 0.40 |
| 5 | 0.35 | 0.36 | 0.36 | 0.36 | 0.36 | 0.35 | 0.35 | 0.36 |

From Examples 1 to 3 and Conventional Example 1 of Tables 2 to 4, it is clear that rubber compositions as elastomer compositions containing 0.5 to 4.4 mass % of the smoked residuum have an S-S curve, a dynamic modulus and a loss tangent equivalent to a rubber composition not containing the smoked residuum. Thus, it is clear that by containing the smoked residuum, it is possible to restrain the usage of an elastomer component without deteriorating the performance of an elastomer composition.

Conventional Example 2

A sample for tensile test was prepared by extruding pellets of olefin based thermoplastic elastomer (made by Mitsui Chemicals, Milastomer 4400B). The breaking stress of the prepared sample was measured by a tensile testing machine made by Toyo Seiki Seisaku-Sho Co., Ltd.

Examples 4-10

The same smoked residuum as used in Examples 1 to 3 was contained in olefin based thermoplastic elastomer (made by Mitsui Chemicals, Milastomer 4400B) based on the compounding amount shown in Table 5 to make pellets. Then, the pellets were extruded to prepare samples for a tensile test. The breaking stress of the prepared samples was measured by a tensile testing machine made by Toyo Seiki Seisaku-Sho Co., Ltd., and the obtained values were evaluated as indexes based on the breaking stress of Conventional Example 2 as 100%. The results are shown in Table 5. The amount of the smoked residuum contained was calculated in reference to the above formula for computation of "smoked residuum content rate in rubber composition".

TABLE 5

| | Smoked Residuum *3 [mass %] | Index of Breaking Stress [%] |
| --- | --- | --- |
| Conventional Example 2 | 0 | 100 |
| Example 4 | 3 | 99 |
| Example 5 | 5 | 99 |
| Example 6 | 10 | 97 |
| Example 7 | 20 | 94 |
| Example 8 | 30 | 90 |
| Example 9 | 50 | 85 |
| Example 10 | 60 | 70 |

From Examples 4 to 10 and Conventional Example 2 of Table 5, it has become clear that it is possible to maintain 70% or more of the breaking stress of the elastomer composition of Conventional Example 2 not containing the smoked residuum, even when the smoked residuum as residuum generated in a fermentative treatment of biomass is contained in resin. Also, from Examples 4 to 9 and 10, it has become clear that it is possible to maintain breaking stress at 85% or more of the breaking stress of the elastomer composition of Conventional Example 2 when the amount of the smoked residuum contained is not more than 50 mass %.

Examples 11-13

Rubber compositions containing sweet potato distilled spirit residue were prepared based on the compounding formulation shown in Table 6 by using the Banbury mixer, a known vulcanizing agent and the like (sulfur: 1.5 parts by mass, a vulcanization accelerator: 2.9 parts by mass [CZ: 1.5 parts by mass, DPG: 1.2 parts by mass, DM: 0.2 parts by mass], ZnO: 2.0 parts by mass, stearic acid: 1.0 parts by mass, an antioxidant agent 6C: 1.0 parts by mass, based on 100 parts by mass of a rubber component) were contained and vulcanized by the normal method, and then on-ice μ was measured and evaluated by the following method. The results are shown in Table 6. In addition, "content rate of sweet potato distilled spirit residue in rubber composition" in Table 6 was calculated by using a formula changing "amount of smoked residuum contained" into "amount of sweet potato distilled spirit residue contained" in the above formula for computation of "smoked residuum content rate in rubber composition".

Conventional Example 3

A rubber composition containing no sweet potato distilled spirit residue was prepared based on the compounding formulation shown in Table 6 by using the Banbury mixer, a known vulcanizing agent and the like (sulfur: 1.5 parts by mass, a vulcanization accelerator: 2.9 parts by mass [CZ: 1.5 parts by mass, DPG: 1.2 parts by mass, DM: 0.2 parts by mass], ZnO: 2.0 parts by mass, stearic acid: 1.0 parts by mass, an antioxidant agent 6C: 1.0 parts by mass, based on 100 parts by mass of a rubber component) were contained and vulcanized by the normal method, and then on-ice μ was measured and evaluated by the following method. The result is shown in Table 6.

(On-Ice μ)

The frictional force of vulcanized rubber obtained by vulcanizing the rubber compositions prepared in Examples 11 to 13 and Conventional Example 3 at 145° C. for 33 minutes was measured on an icy road at a temperature of 0° C. by using a road surface friction testing machine (disclosed in JP-U-H5-066545), and represented as indexes based on the value of Conventional Example 3 as 100. The larger figure is evaluated to be better in braking performance.

TABLE 6

|  |  | Conventional Example 3 | Example 11 | Example 12 | Example 13 |
|---|---|---|---|---|---|
| Rubber Component *4 | parts by mass | 137.5 | 137.5 | 137.5 | 137.5 |
| Carbon Black *5 | parts by mass | 60 | 60 | 60 | 60 |
| Sweet Potato Distilled Spirit Residue *6 | parts by mass | 0 | 2 | 6 | 18 |
| Content Rate of Sweet Potato Distilled Spirit Residue in Rubber Composition | mass % | 0 | 1.0 | 2.9 | 8.4 |
| Content Rate of Sweet Potato Distilled Spirit Residue (Solid Content) in Rubber Composition | mass % | 0 | 0.5 | 1.5 | 4.2 |
| On-ice μ Index (0° C.) |  | 100 | 100.5 | 102 | 104 |

*4 Emulsion polymerized SBR, oil extended with 37.5 parts by mass of aroma oil based on 100 parts by mass of a rubber component
*5 Made by Asahi Carbon Co., Ltd., N110
*6 Residue of a sweet potato distilled spirit produced by conducting a fermentative treatment at a ratio of sweet potato malt:rice malt = 4:1, with a moisture content of 50%, a composition of solid content in residue of sweet potato short fibers:sweet potato cell walls = 1:4

From Examples 11 to 13 and Conventional Example 3 in Table 6, it has become clear that by containing sweet potato distilled spirit residue in a rubber composition, on-ice μ can be slightly improved.

The invention claimed is:

1. An elastomer composition containing residuum generated in a fermentative treatment of an organic matter in an elastomer component,
    wherein the residuum is residuum generated in a fermentative treatment of an organic matter using fermentation microorganisms, and containing cell walls of the fermentation microorganisms,
    wherein the residuum is residuum generated in a fermentative treatment of an organic matter containing at least one of plant cell walls and short fibers of the plant cell walls in chains, and containing at least one of the plant cell walls and short fibers, and
    wherein the fermentative treatment is a treatment using at least one of aspergillus and yeast, and the short fibers have cell walls of at least one of aspergillus and yeast attached.

2. An elastomer composition according to claim 1, wherein the organic matter is biomass.

3. An elastomer composition according to claim 1, wherein the fermentative treatment is an anaerobic fermentative treatment using anaerobic microbes, and residuum generated in the anaerobic fermentative treatment is contained after smoke treatment.

4. An elastomer composition according to claim 1, wherein the fermentative treatment is an aerobic fermentative treatment using aerobic microbes.

5. An elastomer composition according to claim 3, wherein the anaerobic fermentative treatment is a methane fermentative treatment, an ethanol fermentative treatment or a hydrogen fermentative treatment, or a combination thereof.

6. An elastomer composition according to claim 1, wherein a main component of the residuum is peptidoglycan.

7. An elastomer composition according to claim 1, wherein the residuum comprises at least one of cellulose particles and hemicellulose particles as a main component of the plant cell walls.

8. An elastomer composition according to claim 1, wherein the residuum comprises the short fibers, and the short fibers comprises at least one of cellulose short fibers and hemicellulose short fibers.

9. An elastomer composition according to claim 1, wherein the residuum contains at least one of cellulose particles and hemicellulose particles as a main component of the plant cell walls, and short fibers of the plant cell walls in chains.

10. An elastomer composition according to claim 7, wherein the fermentative treatment is a treatment using at least one of aspergillus and yeast, and the cellulose particles and hemicellulose particles have cell walls of at least one of aspergillus and yeast attached.

11. An elastomer composition according to claim 1, wherein an amount of the residuum contained is 1 to 50 parts by mass based on 100 parts by mass of the elastomer component.

12. A tire having at least one part constituted with an elastomer composition according to claim 1.

13. An elastomer composition containing residuum generated in a fermentative treatment of an organic matter in an elastomer component,
    wherein the residuum is residuum generated in a fermentative treatment of an organic matter using fermentation microorganisms, and containing cell walls of the fermentation microorganisms,
    wherein the residuum comprises at least one of cellulose particles and hemicellulose particles as a main component of the plant cell walls, and
    wherein the fermentative treatment is a treatment using at least one of aspergillus and yeast, and the cellulose particles and hemicellulose particles have cell walls of at least one of aspergillus and yeast attached.

14. An elastomer composition according to claim 13, wherein the organic matter is biomass.

15. An elastomer composition according to claim 13, wherein the fermentative treatment is an anaerobic fermentative treatment using anaerobic microbes, and residuum generated in the anaerobic fermentative treatment is contained after smoke treatment.

16. An elastomer composition according to claim 13, wherein the fermentative treatment is an aerobic fermentative treatment using aerobic microbes.

17. An elastomer composition according to claim 15, wherein the anaerobic fermentative treatment is a methane fermentative treatment, an ethanol fermentative treatment or a hydrogen fermentative treatment, or a combination thereof.

18. An elastomer composition according to claim 13, wherein a main component of the residuum is peptidoglycan.

19. An elastomer composition according to claim 13, wherein the residuum comprises at least one of cellulose particles and hemicellulose particles as a main component of the plant cell walls.

20. An elastomer composition according to claim 13, wherein the residuum comprises the short fibers, and the short fibers comprises at least one of cellulose short fibers and hemicellulose short fibers.

21. An elastomer composition according to claim 13, wherein the residuum contains at least one of cellulose particles and hemicellulose particles as a main component of the plant cell walls, and short fibers of the plant cell walls in chains.

22. An elastomer composition according to claim 19, wherein the fermentative treatment is a treatment using at least one of aspergillus and yeast, and the cellulose particles and hemicellulose particles have cell walls of at least one of aspergillus and yeast attached.

23. An elastomer composition according to claim 13, wherein an amount of the residuum contained is 1 to 50 parts by mass based on 100 parts by mass of the elastomer component.

24. A tire having at least one part constituted with an elastomer composition according to claim 13.

* * * * *